United States Patent
Sumiya et al.

(10) Patent No.: US 11,787,699 B2
(45) Date of Patent: Oct. 17, 2023

(54) DIAMOND POLYCRYSTAL AND METHOD OF PRODUCING THE SAME

(71) Applicant: Sumitomo Electric Industries, Ltd., Osaka (JP)

(72) Inventors: Hitoshi Sumiya, Osaka (JP); Yuh Ishida, Osaka (JP); Kensei Hamaki, Osaka (JP); Katsuko Yamamoto, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 109 days.

(21) Appl. No.: 16/763,361

(22) PCT Filed: Nov. 13, 2018

(86) PCT No.: PCT/JP2018/041931
§ 371 (c)(1),
(2) Date: May 12, 2020

(87) PCT Pub. No.: WO2019/098172
PCT Pub. Date: May 23, 2019

(65) Prior Publication Data
US 2020/0290881 A1    Sep. 17, 2020

(30) Foreign Application Priority Data

Nov. 17, 2017   (JP) ................. 2017-221932

(51) Int. Cl.
*C01B 32/26*   (2017.01)
*C08K 3/04*    (2006.01)
*C01B 32/05*   (2017.01)

(52) U.S. Cl.
CPC ........ *C01B 32/26* (2017.08); *B01D 2255/209* (2013.01); *B01D 2255/20715* (2013.01); *B01D 2255/702* (2013.01); *C01B 32/05* (2017.08); *C01P 2004/38* (2013.01); *C08K 3/04* (2013.01)

(58) Field of Classification Search
None
See application file for complete search history.

(56) References Cited

U.S. PATENT DOCUMENTS

| | | | |
|---|---|---|---|
| 2006/0032431 A1* | 2/2006 | Sung | B30B 11/007 117/68 |
| 2009/0305039 A1 | 12/2009 | Sumiya | |
| 2010/0116668 A1* | 5/2010 | Landau | B82Y 30/00 205/50 |
| 2012/0258035 A1 | 10/2012 | Sumiya et al. | |
| 2014/0170055 A1* | 6/2014 | Ikeda | C01B 32/25 423/446 |
| 2015/0209745 A1* | 7/2015 | Mukhopadhyay | B01J 3/065 51/295 |
| 2015/0274533 A1 | 10/2015 | Arimoto et al. | |
| 2016/0221080 A1* | 8/2016 | Higashi | B22F 5/00 |
| 2018/0079010 A1 | 3/2018 | Ishida et al. | |

FOREIGN PATENT DOCUMENTS

| | | |
|---|---|---|
| JP | H03-239978 A | 10/1991 |
| JP | 2011-011920 A | 1/2011 |
| JP | 2014-129218 A | 7/2014 |
| JP | 2016-087481 A | 5/2016 |
| JP | 2016-164102 A | 9/2016 |
| WO | WO-2012/023473 A1 | 2/2012 |

OTHER PUBLICATIONS

Simiya, Hitoshi. "Novel Superhard Nanopolycrystalline materials Synthesized by Direct conversion sintering under high pressure and high temperature". MRS Bulletin. vol. 42. Issue 10: Materials under pressure. 2017. (Year: 2017).*
Ohfuji, Hiroaki, et al. "Influence of Graphite Crystallinity on the micro-texture of nano-polycrystalline diamond obtained by direct conversion". Physics and Chemistry of Minerals. 39. 543-552. (2012). (Year: 2012).*
Irifune, Tetsuo, et al. "Formation of pure polycrystalline diamond . . . ". Physics of the Earth and Planetary Interiors. Science Direct. 593-600, 143-144 (2004). (Year: 2004).*
F. P. Bundy, "Direct Conversion of Graphite to Diamond in Static Pressure Apparatus," J. Chem. Phys., vol. 38, No. 3 (1963) pp. 631-643.
Irifune, Tetsuo et al., "Nature of Polycrystalline Diamond Synthesized by Direct Conversion of Graphite Using Kawai-Type Multianvil Apparatus," New Diamond and Frontier Carbon Technology, vol. 14, No. 5 (2004) pp. 313-327.
S. Naka et al., "Direct conversion of graphite to diamond under static pressure," Nature, vol. 259 (1976) pp. 38-39.
Sumiya, Hitoshi et al., "Synthesis of High-Purity Nano-Polycrystalline Diamond and Its Characterization," SEI Technical Review, No. 165 (2004) pp. 68-74. Sumiya, Hitoshi et al., "Synthesis of High-Purity Nano-Polycrystalline Diamond and Its Characterization," SEI Technical Review, No. 59 (2005) pp. 52-59 (English version).
Wakatsuki, Masao et al., "Notes on Compressible Gasket and Bridgman-Anvil Type High Pressure Apparatus," Japan. J. Appl. Phys., vol. 11, No. 4 (1972) pp. 578-590.
Hiroshi Yamanaka, "Method for preparing finegrained diamond, and its application", Journal of the Japan Society for Abrasive Technology, vol. 60/No. 6, Japan Society for Abrasive Technology, Jun. 1, 2016, pp. 10-13.
Sasaoka, Hideki et al., "XRD, ESR study of nanosized diamond abrasive grits," Journal of the Japan Society for Abrasive Technology, 2006, vol. 50/No. 5, pp. 281-284.

(Continued)

*Primary Examiner* — Sheng H Davis
(74) *Attorney, Agent, or Firm* — Faegre Drinker Biddle & Reath LLP

(57) ABSTRACT

A diamond polycrystal is a diamond polycrystal basically composed of a diamond single phase, wherein the diamond polycrystal is composed of a plurality of diamond grains having an average grain size of less than or equal to 30 nm, and the diamond polycrystal has a carbon dangling bond density of more than or equal to 10 ppm.

4 Claims, No Drawings

(56) References Cited

OTHER PUBLICATIONS

Decision to Grant Patent dated Jan. 21, 2020 (date of draft: Jan. 8, 2020) for corresponding JP 2019-517855, including English machine translation.
Written Opinion of the International Searching Authority dated Feb. 5, 2019 for PCT/JP2018/041931.
Sumiya et al., "Microstructure and Mechanical Behaviors of Nano-Polycrystalline Diamonds Synthesized by Direct Conversion Sintering under HPHT," Materials Research Society, vol. 987, 2007, pp. 81-86, XP00B120248.
Ikeda et al., "Optical properties of ultrapure nano-polycrystalline diamond," Japanese Journal of Applied Physics, vol. 55, 2016, pp. 1-4.

\* cited by examiner

DIAMOND POLYCRYSTAL AND METHOD OF PRODUCING THE SAME

TECHNICAL FIELD

The present disclosure relates to a diamond polycrystal and a method of producing the same. The present application claims the priority to Japanese Patent Application No. 2017-221932 filed on Nov. 17, 2017, the entire contents of which are incorporated herein by reference.

BACKGROUND ART

A diamond polycrystal has an excellent hardness, has no directional property in hardness, and has no cleavability. Hence, the diamond polycrystal is widely used for tools such as a cutting bite, a dresser, and a die, as well as a drill bit and the like. A conventional diamond polycrystal is obtained by sintering a diamond powder, which is a raw material, together with a sintering aid and a binder at high pressure and high temperature (generally, the pressure is about 5 to 8 GPa, and the temperature is about 1300 to 2200° C.) at which diamond is thermodynamically stable.

Examples of the sintering aid usable include: an iron-group element metal such as Fe, Co, or Ni; a carbonate such as $CaCO_3$; and the like. Examples of the binder usable include ceramics such as SiC.

The diamond polycrystal thus obtained includes the used sintering aid and the used binder therein. The sintering aid and the binder have no small influence on mechanical properties, such as hardness and strength, and heat resistance of the diamond polycrystal.

The following diamond polycrystals have been also known: a diamond polycrystal in which a sintering aid has been removed by acid treatment; and a diamond polycrystal using heat-resistant SiC as a binder to achieve an excellent heat resistance. However, these diamond polycrystals have low hardnesses and low strengths, and therefore have insufficient mechanical properties as tool materials.

Meanwhile, a non-diamond carbon material, such as graphite, glassy carbon, or amorphous carbon, can be directly converted into diamond at very high pressure and temperature without using a sintering aid and the like. A polycrystal of a diamond single phase is obtained by sintering the non-diamond carbon material at the same time as directly converting from the non-diamond phase to the diamond phase.

F. P. Bundy, J. Chem. Phys., 38 (1963), pp631-643 (NPL 1), M. Wakatsuki, K. Ichinose, T. Aoki, Japan. J. Appl. Phys., 11 (1972), pp578-590 (NPL 2), and S. Naka, K. Horii, Y. Takeda, T. Hanawa, Nature 259 (1976), p38 (NPL 3) each disclose that a diamond polycrystal is obtained by direct conversion at very high pressure and temperature of 14 GPa to 18 GPa and more than or equal to 3000 K, with the use of graphite as a raw material.

T. Irifune, H. Sumiya, "New Diamond and Frontier Carbon Technology", 14 (2004), p313 (NPL 4), and Sumiya, Irifune, SEI Technical Review 165 (2004), p68 (NPL 5) each disclose a method of obtaining a dense and high-purity diamond polycrystal by direct conversion and sintering by indirect heating at very high pressure and temperature of more than or equal to 12 GPa and more than or equal to 2200° C., with the use of high-purity and highly-crystalline graphite as a starting material.

Problem to be Solved by the Present Disclosure

However, the diamond polycrystal in each of NPLs 1 to 3 is produced by a direct electric heating method of heating an electrically conductive non-diamond carbon material such as graphite by directly passing a current therethrough. Therefore, it is inevitable that unconverted graphite remains. In addition, a grain size of diamond is not uniform and sintering is likely to become partially insufficient. Therefore, a fragment-like polycrystal having insufficient mechanical properties such as hardness and strength is only obtained, and thus, the diamond polycrystal in each of NPLs 1 to 3 is not yet in actual use.

The diamond polycrystal obtained by the method in each of NPLs 4 and 5 has a very high hardness. However, the diamond polycrystal obtained by the method in each of NPLs 4 and 5 has insufficient properties such as wear resistance, chipping resistance and crack propagation resistance, and is unstable.

Therefore, it is an object to provide a diamond polycrystal having an excellent strength while maintaining a high hardness, and a method of producing the diamond polycrystal.

CITATION LIST

Non Patent Literature

NPL 1: F. P. Bundy, J. Chem. Phys., 38 (1963), pp631-643

NPL 2: M. Wakatsuki, K. Ichinose, T. Aoki, Japan. J. Appl. Phys., 11 (1972), pp578-590

NPL 3: S. Naka, K. Horii, Y. Takeda, T. Hanawa, Nature 259 (1976), p38

NPL 4: T. Irifune, H. Sumiya, "New Diamond and Frontier Carbon Technology", 14 (2004), p313

NPL 5: Sumiya, Irifune, SEI Technical Review 165 (2004), p68

SUMMARY OF INVENTION

A diamond polycrystal according to one embodiment of the present disclosure is [1] a diamond polycrystal basically composed of a diamond single phase, wherein the diamond polycrystal is composed of a plurality of diamond grains having an average grain size of less than or equal to 30 nm, and the diamond polycrystal has a carbon dangling bond density of more than or equal to 10 ppm.

A method of producing a diamond polycrystal according to another embodiment of the present disclosure is [2] a method of producing a diamond polycrystal, the method including: preparing a non-diamond carbon material having a degree of graphitization of less than or equal to 0.2; and obtaining a diamond polycrystal by directly converting the non-diamond carbon material into cubic diamond and hexagonal diamond and sintering the non-diamond carbon material under pressure and temperature conditions under which diamond is thermodynamically stable, without adding a sintering aid and a binder.

DETAILED DESCRIPTION

Advantageous Effect of the Present Disclosure

According to the above-described embodiments, there can be provided a diamond polycrystal having an excellent strength while maintaining a high hardness, and a method of producing the diamond polycrystal.

Description of Embodiments

First, embodiments of the present disclosure are listed and described.

A diamond polycrystal according to one embodiment of the present disclosure is (1) a diamond polycrystal basically composed of a diamond single phase, wherein the diamond polycrystal is composed of a plurality of diamond grains having an average grain size of less than or equal to 30 nm, and the diamond polycrystal has a carbon dangling bond density of more than or equal to 10 ppm.

Accordingly, the diamond polycrystal can have an excellent strength while maintaining a high hardness.

(2) Preferably, the diamond polycrystal includes at least one element selected from the group consisting of hydrogen, oxygen and nitrogen as an impurity, and each of concentrations of the hydrogen, the oxygen and the nitrogen in the diamond polycrystal is less than or equal to 1 ppm.

When the impurity concentrations in the diamond polycrystal are within the above-described range, the diamond polycrystal can have an especially excellent strength.

(3) Preferably, the concentration of the nitrogen in the diamond polycrystal is less than 0.1 ppm.

When the concentration of the nitrogen in the diamond polycrystal is within the above-described range, the diamond polycrystal can have an especially excellent strength.

(4) Preferably, in the diamond polycrystal, a crack generation load is more than or equal to 10 N in a breaking strength test in which a spherical diamond indenter having a tip radius of 50 μm is pressed against a surface of the diamond polycrystal at a load rate of 1 N/second.

The above-described diamond polycrystal can have an excellent breaking strength and an excellent chipping resistance.

A method of producing a diamond polycrystal according to another aspect of the present disclosure is (5) a method of producing a diamond polycrystal, the method including: preparing a non-diamond carbon material having a degree of graphitization of less than or equal to 0.2; and obtaining a diamond polycrystal by directly converting the non-diamond carbon material into cubic diamond and hexagonal diamond and sintering the non-diamond carbon material under pressure and temperature conditions under which diamond is thermodynamically stable, without adding a sintering aid and a binder.

Accordingly, the diamond polycrystal having an excellent strength while maintaining a high hardness can be obtained.

Description of Embodiments

The following describes specific examples of a diamond polycrystal according to one embodiment of the present disclosure. In the present specification, the expression "A to B" represents a range of lower to upper limits (i.e., more than or equal to A and less than or equal to B). When no unit is indicated for A and a unit is indicated only for B, the unit of A is the same as the unit of B.

When a compound is herein expressed with a chemical formula and when an atomic ratio is not particularly limited, all atomic ratios that have conventionally been known are encompassed and the atomic ratio should not necessarily be limited only to those in a stoichiometric range.

<Diamond Polycrystal>

The diamond polycrystal according to the present embodiment is a diamond polycrystal basically composed of a diamond single phase, wherein the diamond polycrystal is composed of a plurality of diamond grains having an average grain size of less than or equal to 30 nm, and the diamond polycrystal has a carbon dangling bond density of more than or equal to 10 ppm.

Since the diamond polycrystal according to the present embodiment is basically composed of a diamond single phase, the diamond polycrystal according to the present embodiment does not include a binder phase (binder) constituted of one or both of a sintering aid and a binder, and falling of grains that would have been otherwise caused due to a difference in thermal expansion coefficient does not occur even under a high-temperature condition. "Being basically composed of a diamond single phase" means that a diamond component in the diamond polycrystal is more than or equal to 99% by volume. In addition to the diamond component, the diamond polycrystal may include less than or equal to 1% by volume of hydrogen, oxygen, nitrogen, and an unavoidable impurity (such as, for example, Na, Mg, Al, Si, P, S, Cl, K, Ca, Ti, Fe, or Mo) other than these in total. By observation of a surface of the diamond polycrystal with an optical microscope or an electron microscope, it can be confirmed that the diamond polycrystal includes more than or equal to 99% by volume of the diamond component and does not include the binder phase.

Furthermore, since the diamond polycrystal is a polycrystal composed of a plurality of crystal grains and the average grain size of the diamond grains that form the diamond polycrystal is less than or equal to 30 nm, the diamond polycrystal has no directional property and cleavability unlike a single crystal and has isotropic hardness and wear resistance in all the directions.

<Diamond Grains>

In order to allow the diamond polycrystal to exhibit isotropic hardness and wear resistance in all the directions, the average grain size of the diamond grains is preferably less than or equal to 20 nm, and is more preferably less than or equal to 10 nm. On the other hand, in order to obtain a mechanical strength specific to diamond, the lower limit value of the average grain size of the diamond grains is preferably more than or equal to 1 nm.

Since the diamond polycrystal according to the present embodiment is composed of the diamond grains having such a small grain size, the diamond polycrystal according to the present embodiment is applicable to a tool for a wide range of applications such as high-load processing and microprocessing.

The average grain size of the diamond grains can be determined by an intercept method employing a scanning electron microscope (SEM). Specifically, using the scanning electron microscope, the diamond polycrystal is first observed at a magnification of ×1000 to ×100000, to thereby obtain a SEM image.

Next, a circle is drawn on the SEM image and then eight straight lines are drawn from the center of the circle to the outer circumference of the circle in a radial manner (in such a manner that intersecting angles between the straight lines become substantially equal to one another). In this case, the observation magnification and the diameter of the circle are preferably set such that the number of diamond grains (crystal grains) on each straight line becomes about 10 to 50.

Next, the number of crystal grain boundaries of the diamond grains crossed by each of the straight lines is counted, then, the length of the straight line is divided by the number thereof to find an average intercept length, then, the average intercept length is multiplied by 1.128, and the resulting value is regarded as the average grain size. It is suitable that the average grain size is more preferably determined for each of several SEM images in the above-described manner, and the average value of the average grain sizes of the images is regarded as the average grain size.

An aspect ratio (a/b) of a major axis a and a minor axis b of each diamond grain is preferably 1≤a/b<4 in order to suppress occurrence of minute cracks. Here, the major axis refers to a distance between two points separated the most from each other on the contour line of a diamond grain. The minor axis refers to a distance of a straight line that is orthogonal to the straight line defining the major axis and that has the longest distance between two intersections with the contour of the diamond grain.

<Carbon Dangling Bond>

The diamond polycrystal according to the present embodiment has a carbon dangling bond density of more than or equal to 10 ppm, and thus, has an excellent strength. Although the reason for this is unclear, the present inventors estimate the reason as follows.

A carbon dangling bond refers to a bonding hand that does not have a bonding partner and exists as an unpaired electron, of bonding hands of a carbon atom. The carbon dangling bond exists near a surface of a covalent crystal or in the vicinity of an internal lattice defect. The carbon dangling bond is high in chemical activity and is in an unstable state.

When the carbon dangling bond density is as high as more than or equal to 10 ppm, it is conceivable that carbon dangling bonds existing on a surface of a diamond grain are entangled with carbon dangling bonds existing on a surface of an adjacent diamond grain, and thus, the diamond grains are strongly bonded to each other. The carbon dangling bond density is a value indicating a ratio of the number of unbonding hands (carbon dangling bonds) of carbon atoms mainly existing on a surface of a diamond grain relative to the total number of bonding hands of carbon atoms forming the diamond grain.

In addition, when the carbon dangling bond density is as high as more than or equal to 10 ppm, many structural defects originating from entanglement of the carbon dangling bonds exist in grain boundaries between the diamond grains. These structural defects effectively inhibit minute cracks and progress of plastic deformation, which is considered to lead to improved strength and toughness of the grain boundaries.

It is estimated from the foregoing that the diamond polycrystal having a carbon dangling bond density of more than or equal to 10 ppm has an excellent strength.

In order to improve bonding strength between the diamond grains, the carbon dangling bond density in the diamond polycrystal is preferably more than or equal to 30 ppm, and is more preferably more than or equal to 40 ppm. Although the upper limit value of the carbon dangling bond density is not particularly limited, the upper limit value is preferably less than or equal to 1000 ppm in view of production.

The carbon dangling bond density in the diamond polycrystal can be measured using an electron spin resonance device (ESR). Specifically, a differential curve of an ESR spectrum corresponding to an unpaired spin of a carbon dangling bond is measured, then, the differential curve is integrated twice to obtain a signal strength, and the carbon dangling bond density is calculated from the strength.

<Impurity>

Preferably, the diamond polycrystal according to the present embodiment includes, as an impurity, at least one element selected from the group consisting of hydrogen, oxygen and nitrogen, and each of concentrations of hydrogen, oxygen and nitrogen in the diamond polycrystal is less than or equal to 1 ppm. The concentrations of hydrogen, oxygen and nitrogen are values indicating ratios of the number of atoms of hydrogen, oxygen and nitrogen relative to the number of atoms of the entire diamond polycrystal, respectively. Accordingly, the diamond polycrystal has an excellent strength. Although the reason for this is unclear, the present inventors estimate the reason as follows.

Impurities such as nitrogen contained in raw material grains of graphite or the like in a solid solution state exist in the diamond polycrystal. In addition, adsorption gas composed of hydrogen, oxygen, nitrogen and the like existing on a surface of the raw material grains, adsorption water, and air existing in gaps of the raw material grains are taken into the diamond polycrystal in a process of producing the diamond polycrystal, and exist as impurities such as hydrogen, oxygen and nitrogen.

When the impurities such as hydrogen, oxygen and nitrogen exist in the grain boundaries of the diamond grains, these impurities are bonded to carbon dangling bonds existing in the grain boundaries. It is conceivable that the carbon dangling bonds bonded to the impurities lose their bonding hands and are not entangled with other carbon dangling bonds. Therefore, when the diamond polycrystal includes a large amount of impurities, the bonding strength between the diamond grains through the carbon dangling bonds is likely to decrease, which causes grain boundary destruction or falling of grains.

In the diamond polycrystal according to the present embodiment, each of the concentrations of hydrogen, oxygen and nitrogen in the diamond polycrystal is less than or equal to 1 ppm, which is very low, and thus, bonding of these impurities to the carbon dangling bonds is less likely to decrease the bonding strength between the diamond grains through the carbon dangling bonds. Therefore, it is estimated that the diamond polycrystal can have an excellent strength.

Each of the concentrations of hydrogen, oxygen, and nitrogen in the diamond polycrystal is preferably less than or equal to 1 ppm, and is more preferably less than or equal to 0.1 ppm in order to improve strength. Moreover, a total impurity concentration in the diamond polycrystal is preferably less than or equal to 3 ppm, and is more preferably less than or equal to 0.3 ppm. Although the lower limit value of each of the concentrations of hydrogen, oxygen, and nitrogen in the diamond polycrystal is not particularly limited, the lower limit value is preferably more than or equal to 0.001 ppm in view of production.

In the diamond polycrystal according to the present embodiment, the concentration of nitrogen in the diamond polycrystal is preferably less than 0.1 ppm. Accordingly, nitrogen has a small influence on the bonding strength between the diamond grains, and thus, the diamond polycrystal can maintain an excellent strength. The concentration of nitrogen in the diamond polycrystal is more preferably less than or equal to 0.01 ppm, and is further preferably less than or equal to 0.001 ppm in order to improve strength.

Each of the concentrations of hydrogen, oxygen, and nitrogen in the diamond polycrystal can be measured by secondary ion mass spectrometry (SIMS).

<Strength>

In the diamond polycrystal according to the present embodiment, a crack generation load is preferably more than or equal to 10 N in a breaking strength test in which a spherical diamond indenter having a tip radius (R) of 50 µm is pressed against a surface of the diamond polycrystal at a load rate of 1 N/second. When the crack generation load is more than or equal to 10 N, the diamond polycrystal has an excellent breaking strength and an excellent chipping resistance, and can cut a hard difficult-to-cut material without occurrence of chipping of a cutting edge when used as a tool material. The crack generation load is more preferably more than or equal to 15 N, and is further preferably more than or equal to 18 N. Although the upper limit value of the crack generation load is not particularly limited, the upper limit value is preferably less than or equal to 50 N in view of production.

A specific method of the breaking strength test is as follows. A spherical diamond indenter having a tip radius R of 50 μm is prepared. A load is applied to each sample at a load rate of 1 N/second at a room temperature (23° C.±5° C.). A load (crack generation load) at the moment of generation of crack in the sample is measured. The moment of generation of crack is measured using an AE sensor. This measurement is performed 3 times. The average value of the three values of the results of the measurement performed 3 times is regarded as the crack generation load. It is indicated that as the crack generation load is larger, the strength of the sample is higher and the chipping resistance thereof is more excellent.

When an indenter having a tip radius (R) smaller than 50 μm is used as the measurement indenter, the sample is plastically deformed before generation of crack, and thus, a precise strength with respect to crack cannot be measured. Although measurement is possible using an indenter having a tip radius (R) larger than 50 μm, the load required before generation of crack is large and a contact area between the indenter and the sample is large, which causes problems such as a marked influence on measurement accuracy due to surface accuracy of the sample and a marked influence of crystal orientation of a single crystal. Therefore, the indenter having a tip radius (R) of 50 μm is suitably used in the breaking strength test for the diamond polycrystal.

<Hardness>

In the diamond polycrystal according to the present embodiment, a Knoop hardness is preferably more than or equal to 120 GPa. The diamond polycrystal having a Knoop hardness of more than or equal to 120 GPa has a high hardness and an excellent wear resistance. The Knoop hardness is more preferably more than or equal to 130 GPa. Although the upper limit value of the Knoop hardness is not particularly limited, the upper limit value is preferably less than or equal to 300 GPa in view of production.

A method of evaluating the Knoop hardness (hereinafter, also described as "HK" in the unit of GPa) will be described. First, a load F (N) is applied to a surface of the diamond polycrystal for 10 seconds to form an indentation. A width a (μm) of the obtained indentation is measured and the Knoop hardness (HK) is calculated in accordance with the following formula (1):

$$HK = 14229 \times F/a^2 \qquad \text{Formula (1)}.$$

The diamond polycrystal according to the present embodiment can be suitably used as a material for tools such as a cutting bite, a dresser and a die, and a drill bit.

<Method of Producing Diamond Polycrystal>

A method of producing a diamond polycrystal according to another embodiment of the present disclosure includes: preparing a non-diamond carbon material having a degree of graphitization of less than or equal to 0.2; and directly converting the non-diamond carbon material into cubic diamond and hexagonal diamond and sintering the non-diamond carbon material under pressure and temperature conditions under which diamond is thermodynamically stable, without adding a sintering aid and a binder.

(Step of Preparing Non-Diamond Carbon Material)

The method of producing the diamond polycrystal according to the present embodiment includes first preparing a non-diamond carbon material having a degree of graphitization of less than or equal to 0.2. The non-diamond carbon material prepared in the preparing step is not particularly limited as long as the non-diamond carbon material has a degree of graphitization of less than or equal to 0.2 and is a carbon material other than diamond.

For example, by producing a non-diamond carbon material from a high-purity gas through a thermal decomposition method, a non-diamond carbon material can be obtained in which a degree of graphitization is less than or equal to 0.2 and the concentration of each of impurities such as hydrogen, oxygen, and nitrogen is less than or equal to 1 ppm.

The non-diamond carbon material is not limited to the one produced from the high-purity gas through the thermal decomposition method. Examples thereof may include: graphite having a low degree of graphitization such as finely pulverized graphite; a noncrystalline carbon material such as amorphous carbon or glassy carbon; and a mixture of these.

Degree of graphitization P of the non-diamond carbon material is determined as follows. A spacing $d_{002}$ of a (002) plane of the graphite of the non-diamond carbon material is measured by performing X-ray diffraction of the non-diamond carbon material. A ratio p of a turbostratic structure portion of the non-diamond carbon material is calculated in accordance with the following formula (2):

$$d_{002} = 3.440 - 0.086 \times (1-p^2) \qquad \text{Formula (2)}.$$

From the obtained ratio p of the turbostratic structure portion, degree of graphitization P is calculated in accordance with the following formula (3):

$$P = 1 - p \qquad \text{Formula (3)}.$$

In order to suppress crystal grain growth, the non-diamond carbon material preferably includes no iron-group element metal, which is an impurity.

In order to suppress crystal grain growth and promote conversion to diamond, the non-diamond carbon material preferably includes low concentrations of hydrogen, oxygen, nitrogen, and the like, which are impurities. Each of the concentrations of hydrogen, oxygen, and nitrogen in the non-diamond carbon material is preferably less than or equal to 1 ppm, and is more preferably less than or equal to 0.1 ppm. Moreover, a total impurity concentration in the non-diamond carbon material is preferably less than or equal to 3 ppm, and is more preferably less than or equal to 0.3 ppm.

Each of the concentrations of the impurities such as hydrogen, oxygen, and nitrogen in the non-diamond carbon material can be measured by secondary ion mass spectrometry (SIMS).

(Step of Obtaining Diamond Polycrystal)

The method of producing the diamond polycrystal according to the present embodiment includes next obtaining a diamond polycrystal by directly converting the above-described non-diamond carbon material into cubic diamond and hexagonal diamond and sintering the above-described non-diamond carbon material under pressure and temperature conditions under which diamond is thermodynamically stable, without adding a sintering aid and a binder.

By placing the above-described non-diamond carbon material under the pressure and temperature conditions under which diamond is thermodynamically stable, without adding a sintering aid and a binder, the non-diamond carbon material is directly converted into cubic diamond and hexagonal diamond and sintered, and thus, the diamond polycrystal having a high hardness and a high strength is obtained.

The sintering aid refers to a catalyst that promotes sintering of a material, which is a raw material, and examples thereof include an iron-group element metal such as Co, Ni or Fe, a carbonate such as $CaCO_3$, and the like. The binder refers to a material that bonds a material, which is a raw material, and examples thereof include ceramics such as SiC, and the like.

The pressure and temperature conditions under which diamond is thermodynamically stable refer to pressure and temperature conditions under which a diamond phase is a thermodynamically stable phase in a carbon-based material. Among them, examples of a condition under which sintering is possible without adding the sintering aid and the binder and a microstructure is obtained include a condition that the temperature is 1500° C. to 2000° C. when the pressure is 7 GPa, a condition that the temperature is 1500° C. to 2300° C. when the pressure is 10 GPa, and a condition that the temperature is 1500° C. to 2400° C. when the pressure is 15 GPa. When the temperature exceeds 2400° C., the grain sizes of the diamond grains become coarse irrespective of the pressure, with the result that a diamond polycrystal having a high strength may be unable to be obtained. On the other hand, when the temperature is lower than 1500° C., sinterability is decreased, with the result that bonding strength between the diamond grains may be decreased irrespective of the pressure.

A high-pressure high-temperature generation apparatus used in the method of producing the diamond polycrystal according to the present embodiment is not particularly limited as long as it is possible to attain pressure and temperature conditions under which the diamond phase is a thermodynamically stable phase; however, in order to improve productivity and workability, the high-pressure high-temperature generation apparatus is preferably of belt type or multi-anvil type. Moreover, a container for storing the non-diamond carbon material serving as the raw material is not particularly limited as long as the container is composed of a material having high-pressure and high-temperature resistances. Ta, Nb, or the like is used suitably therefor, for example.

In order to prevent introduction of an impurity into the diamond polycrystal, for example, the non-diamond carbon material serving as the raw material is preferably heated in vacuum and sealed in a capsule composed of a refractory metal such as Ta or Nb, and adsorption gas and air are removed from the non-diamond carbon material so as to directly convert the non-diamond carbon material into cubic diamond and hexagonal diamond at very high pressure and temperature (pressure of 6 to 20 GPa and temperature of 1500 to 2400° C.).

EXAMPLES

The following describes the present embodiment more specifically by way of examples. However, the present embodiment is not limited by these examples.

Production Examples 1 to 7

Non-diamond carbon materials having degrees of graphitization and impurity concentrations shown in Table 1 are prepared. In a production example 6, a general, isotropic graphite produced by calcining a graphite powder is prepared. In a production example 7, a high-purity highly oriented pyrolytic graphite (HOPG) is prepared by heat-treating, at a high temperature exceeding 2000° C., a high-purity carbon material synthesized by thermal decomposition of a high-purity methane gas.

Next, the non-diamond carbon material is heated in vacuum and sealed in a capsule composed of Ta. A high-pressure high-temperature generation apparatus is used to perform a high-pressure high-temperature process under the condition that a pressure is 16 GPa and a temperature is 2200° C. (the pressure and the temperature at which diamond is thermodynamically stable). It should be noted that no sintering aid and no binder are added to the non-diamond carbon material.

For each of the obtained diamond polycrystals, the average grain size of diamond grains, structure form, impurity concentration, carbon dangling bond density, crack generation load, and Knoop hardness are measured.

(Average Grain Size of Diamond Grains)

The average grain size of the diamond grains included in each of the diamond polycrystals is determined by an intercept method employing a scanning electron microscope (SEM).

First, the diamond polycrystal is observed using a scanning electron microscope to obtain a SEM image.

Next, a circle is drawn on the SEM image and then eight straight lines are drawn from the center of the circle to the outer circumference of the circle in a radial manner (in such a manner that intersecting angles between the straight lines become substantially equal to one another). In this case, the observation magnification and the diameter of the circle are set such that the number of diamond grains on each straight line becomes about 10 to 50.

Then, the number of crystal grain boundaries of the diamond grains crossed by each of the straight lines is counted, then, the length of the straight line is divided by the number thereof to find an average intercept length, then, the average intercept length is multiplied by 1.128, and the resulting value is regarded as the average grain size.

It should be noted that the magnification of the SEM image is ×30000. This is because with a magnification equal to or less than this magnification, the number of grains in the circle is increased, it becomes difficult to see grain boundaries to result in miscounting, and a plate structure is highly likely to be included when drawing the lines. This is also because with a magnification equal to or more than this, the number of grains in the circle is too small to accurately calculate the average grain size.

Moreover, three SEM images captured in one sample at separate portions are used for each of the production examples, an average grain size is found by the above-described method for each SEM image, and the average value of the three average grain sizes obtained is regarded as an average grain size. Results are shown in the column "Average Grain Size" in Table 1.

(Structure Form)

A surface of each diamond polycrystal is observed at three portions in a region of more than or equal to 0.01 $cm^2$, using a SEM or a transmission electron microscope (TEM). A case in which the surface of the diamond polycrystal is composed of diamond grains having an aspect ratio of less than or equal to 3 is evaluated as "uniform", and a case in which the surface of the diamond polycrystal is composed of diamond grains having an aspect ratio exceeding 3 is evaluated as "lamellar". A case in which a "uniform" region and a "lamellar" region are mixed on the surface of one diamond polycrystal is evaluated as "uniform+lamellar". Results are shown in the column "Structure Form" in Table 1.

(Impurity Concentration)

SIMS is used to measure each of the concentrations of nitrogen (N), hydrogen (H), and oxygen (O) in the diamond polycrystal under the following conditions. Results are shown in the column "Impurity Concentration" in Table 1.

(Carbon Dangling Bond Density)

The carbon dangling bond density in the diamond polycrystal is measured using an electron spin resonance device (ESR). Specifically, a differential curve of an ESR spectrum corresponding to an unpaired spin of a carbon dangling bond is measured, then, the differential curve is integrated twice to obtain a signal strength, and the carbon dangling bond density is calculated from the strength. Results are shown in the column "Carbon Dangling Bond Density" in Table 1.

(Crack Generation Load)

In order to measure the crack generation load for each diamond polycrystal, a breaking strength test is performed under the following conditions.

A spherical diamond indenter having a tip radius R of 50 μm is prepared. A load is applied to each sample at a load rate of 1 N/second at a room temperature (23° C.±5° C.). A load (crack generation load) at the moment of generation of crack in the sample was measured. The moment of generation of crack was measured using an AE sensor. This measurement was performed 5 times. The average value of the five values of the results of the measurement performed 5 times as described above is regarded as the crack generation load of each sample. Results are shown in the column "Crack Generation Load" in Table 1. It is indicated that as the crack generation load is larger, the strength of the sample is higher and the chipping resistance thereof is more excellent.

(Knoop Hardness)

The Knoop hardness of the diamond polycrystal is measured using a Knoop hardness tester. Specifically, a load of 4.9 N is applied to the surface of the diamond polycrystal for 10 seconds, to thereby form an indentation. A width a of the obtained indentation was measured and the Knoop hardness (HK) was calculated in accordance with the following formula (1). Results are shown in the column "Knoop Hardness" in Table 1.

$$HK = 14229 \times 4.9/a^2 \qquad \text{Formula (1)}$$

hydrogen and oxygen is less than 1 ppm, the carbon dangling bond density is more than or equal to 10 ppm, and the grain boundary strength between the diamond grains is high. Furthermore, each of the diamond polycrystals of production examples 1 to 4 is composed of a plurality of diamond grains having an average grain size of less than or equal to 30 nm, and thus, an area of grain boundaries having a high grain boundary strength is large. Therefore, each of the diamond polycrystals of production examples 1 to 4 has a large crack generation load, an excellent strength and an excellent chipping resistance while maintaining a high hardness.

In the diamond polycrystal of production example 5, each of the concentrations of nitrogen, hydrogen and oxygen is less than 1 ppm, while the lamellar structure is included as the structure form, the carbon dangling bond density is 8 ppm, the grain boundary strength between the diamond grains is slightly low, the crack generation load is small, and the strength and the chipping resistance are low.

In the diamond polycrystal of production example 6, the lamellar structure is included as the structure form, each of the concentrations of nitrogen, hydrogen and oxygen is more than or equal to 10 ppm, and the amount of impurities existing in the grain boundaries between the diamond grains is larger than that of production examples 1 to 4. Therefore, the grain boundary strength decreases, and thus, the crack generation load is small, and the strength and the chipping resistance are low. It should be noted that a reason why the crack generation load of production example 6 ranges between 6 N and 8 N is that the diamond polycrystal of production example 6 has great anisotropy in structure state.

In the diamond polycrystal of production example 7, each of the concentrations of nitrogen, hydrogen and oxygen is less than 1 ppm. However, the degree of graphitization is high and ultrahigh-purity and highly-crystalline (oriented) graphite is used as a starting material, and thus, the diamond polycrystal of production example 7 is composed of lamellar grains having a large grain size. Therefore, the diamond polycrystal of production example 7 has great anisotropy in strength, has a small grain boundary area, and has a low dangling bond density. Thus, the diamond polycrystal of production example 7 has a small crack generation load, a low strength and a low chipping resistance.

It should be noted that a reason why the crack generation load of production example 7 ranges between 5 N and 17 N and the Knoop hardness thereof ranges between 110 GPa and 140 GPa is that the diamond polycrystal of production example 7 has great anisotropy in structure state.

TABLE 1

| | | | Diamond Polycrystal | | | | | | |
|---|---|---|---|---|---|---|---|---|---|
| Production Example No. | Non-Diamond Carbon Material Degree of Graphitization | Average Grain Size of Diamond Grains (nm) | Structure Form | Impurity Concentration (ppm) | | | Carbon Dangling Bond Density (ppm) | Crack Generation Load (N) | Knoop Hardness (GPa) |
| | | | | N | H | O | | | |
| 1 | 0.05 | ≤10 | uniform | <0.01 | <1 | <1 | 40.2 | 20 | 133 |
| 2 | 0.07 | ≤10 | uniform | <0.01 | <1 | <1 | 35.0 | 16 | 130 |
| 3 | 0.17 | 20 | uniform | <0.01 | <1 | <1 | 16.4 | 12 | 131 |
| 4 | 0.20 | 25 | uniform | <0.01 | <1 | <1 | 12.0 | 10 | 130 |
| 5 | 0.39 | 30 | uniform + lamellar | <0.01 | <1 | <1 | 8.2 | 9 | 133 |
| 6 | 0.50 | 65 | uniform + lamellar | 125 | 350 | 10 | 3.4 | 6-8 | 135 |
| 7 | 0.82 | 300 | lamellar | <0.01 | <1 | <1 | 2.5 | 5-17 | 110-140 |

(Evaluation Results)

In each of the diamond polycrystals of production examples 1 to 4, each of the concentrations of nitrogen, It should be understood that the embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A diamond polycrystal comprising more than or equal to 99% by volume of a diamond component, wherein
the diamond polycrystal is composed of a plurality of diamond grains having an average grain size of less than or equal to 30 nm,
the diamond polycrystal has a carbon dangling bond density of more than or equal to 10 ppm, wherein the carbon dangling bond density is a value indicating a ratio of the number of unbonding hands of carbon atoms relative to the total number of bonding hands of carbon atoms forming the diamond grain, and
a surface of the diamond polycrystal is composed of the diamond grains, the diamond grains having an aspect ratio of less than or equal to 3.

2. The diamond polycrystal according to claim 1, wherein
the diamond polycrystal includes at least one element selected from the group consisting of hydrogen, oxygen and nitrogen as an impurity, and
each of concentrations of the hydrogen, the oxygen and the nitrogen in the diamond polycrystal is less than or equal to 1 ppm.

3. The diamond polycrystal according to claim 1, wherein the concentration of the nitrogen in the diamond polycrystal is less than 0.1 ppm.

4. The diamond polycrystal according to claim 1, wherein a crack generation load is more than or equal to 10 N in a breaking strength test in which a spherical diamond indenter having a tip radius of 50 μm is pressed against a surface of the diamond polycrystal at a load rate of 1 N/second.

* * * * *